(No Model.) 2 Sheets—Sheet 2.
J. H. SIMPSON.
ART OF MAKING TURN BUCKLES.
No. 403,965. Patented May 28, 1889.
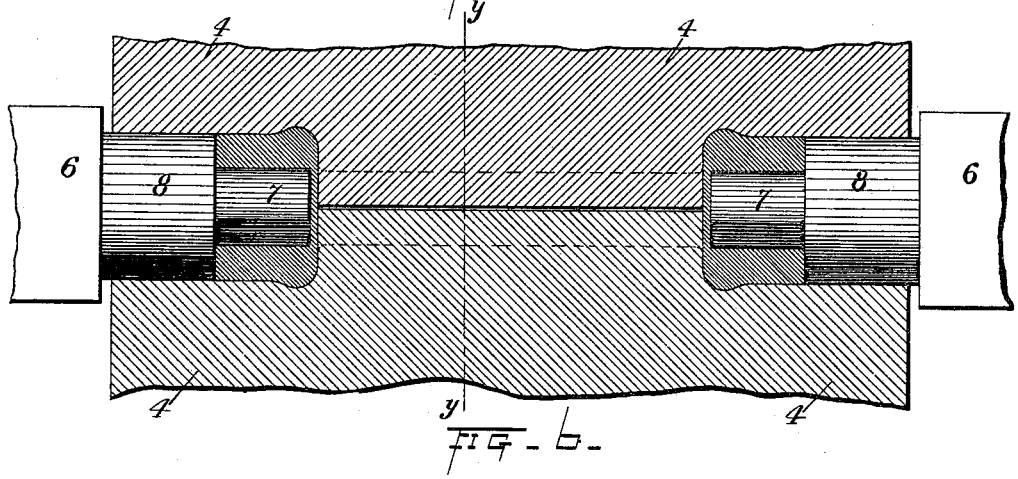
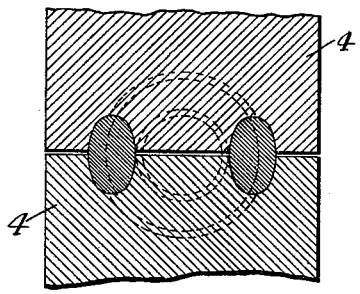
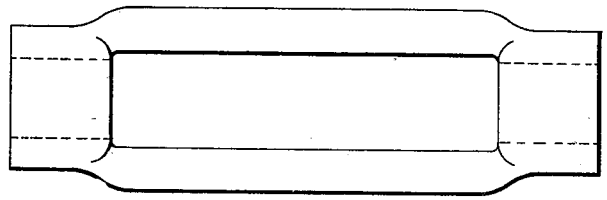
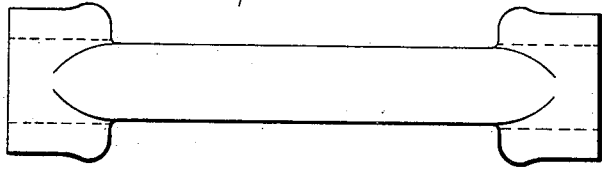
WITNESSES. INVENTOR.

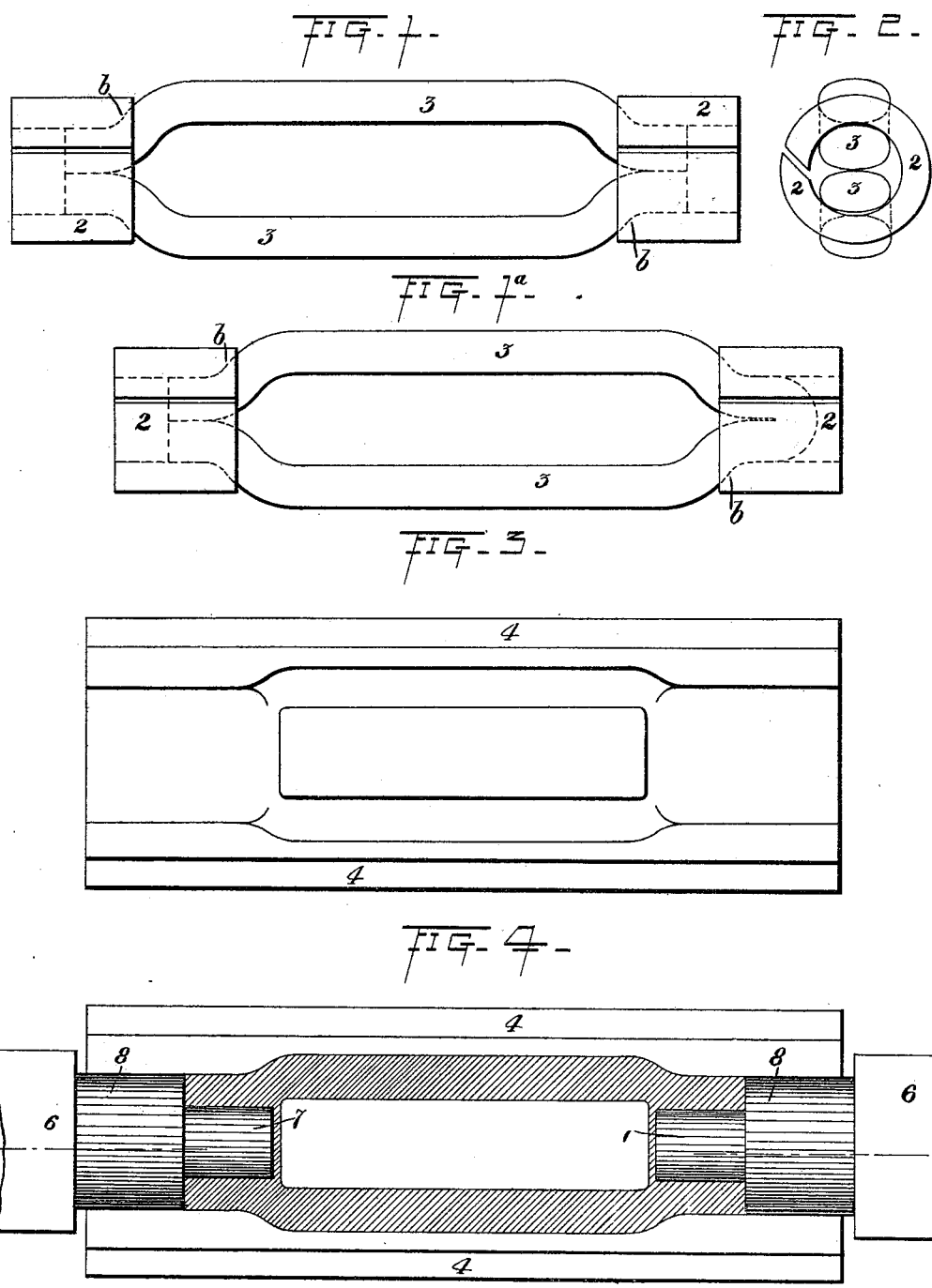

UNITED STATES PATENT OFFICE.

JAMES H. SIMPSON, OF PITTSBURG, PENNSYLVANIA, ASSIGNOR TO CARNEGIE, PHIPPS & CO., (LIMITED,) OF SAME PLACE.

ART OF MAKING TURN-BUCKLES.

SPECIFICATION forming part of Letters Patent No. 403,965, dated May 28, 1889.

Application filed October 8, 1888. Serial No. 287,505. (No model.)

*To all whom it may concern:*

Be it known that I, JAMES H. SIMPSON, of Pittsburg, in the county of Allegheny and State of Pennsylvania, have invented a new and useful Improvement in the Art of Making Turn-Buckles; and I do hereby declare the following to be a full, clear, and exact deact description thereof, reference being had to the accompanying drawings, in which—

Figure 1 is a plan view illustrating the compound blank from which a turn-buckle is made according to my invention. Fig. 2 is an end view thereof. Fig. 1ª is a plan view of a modified form of blank, which is substantially the same as that shown in Fig. 1. Fig. 3 is a plan view of one of the dies which I prefer to use in the manufacture of the turn-buckle. Fig. 4 is a plan view of the same in connection with the end mandrels or tongues which are used to shape and compress the nuts or ends of the turn-buckle, the turn-buckle being shown thereon in longitudinal section. Fig. 5 is a vertical longitudinal section on the line $x\ x$ of Fig. 4. Fig. 6 is a vertical cross-section on the line $y\ y$ of Fig. 5. Fig. 7 is a plan view, and Fig. 8 a side view, of the finished turn-buckle.

Like symbols of reference indicate like parts.

In practicing the method of manufacture which is the subject of this application I first form a compound blank of the sort shown in Figs. 1 and 2, which is composed of two pieces, 3, of iron, preferably of the shape in cross-section and about the desired length of the straps of the finished buckle, and shape them into the form shown in Fig. 1, so that when placed together, as shown in that figure, their ends shall be in contact and their middle portions spread out from each other, though the last-named feature is not essential, as the strap-pieces 3 may be made substantially parallel and spread after they have been united at the ends, as hereinafter described; or, if desired, the strap-pieces 3 may be composed of a single piece of metal of twice the length of one of the pieces shown in Fig. 1 and bent back upon itself, the only difference between this form and that shown in Fig. 1 being that the strap-pieces are integral at their ends. I illustrate this in Fig. 1ª. The ends of the strap-pieces 3 are then confined together by bands or rings 2, which are placed over these ends, and are preferably of sufficient length to project beyond the same. These bands or rings may consist of strips of metal scarfed at the ends and bent round into angular form, the scarfed ends being adapted to be subsequently united in the shaping and welding of the turn-buckle; or the bands may consist of rings or sections of tubing completely welded before they are put on the strap-pieces 3. The material of which the bands are made is preferably scarfed at the end, as at $b$, to conform to the shape of the shoulders of the strap-pieces 3, and to prevent the band from cutting into these strap-pieces in the end compression of the dies.

When the compound turn-buckle blank has been so formed, it is, when at a welding heat, welded and shaped into the finished turn-buckle by any suitable means, the parts 3 forming the straps of the buckle and the bands 2 forming the nuts or heads. I have illustrated suitable dies for this purpose in Figs. 3, 4, 5, and 6. They consist of two dies for holding and operating on the blank laterally, and two mandrels and compressing-dies which operate on the blank at the ends and reduce it to its final shape. There are two dies, 4 4, which act on the sides of the blank. These are provided with cavities shaped conformably to the shape of the finished buckle, having end cavities open externally for the nuts of the buckle.

6 6 are the plungers which carry the dies used to shape the heads or nuts of the buckle. These plungers carry at their ends tongues or compressing-mandrels 7, which are adapted to enter the bands 2 within the end cavities of the dies 4, and at their bases are annular collars 8, which also enter the end cavities of the dies and engage the outer extremities of the bands. The plungers 6 are actuated by cams, sliding wedges, or any other convenient power devices.

The operation is as follows: The compound blank, at a welding heat, is placed between the dies 4 4. These dies are actuated so as to cause them to compress the interposed blank, and the plungers 6 6 are actuated so that the tongue 7 shall enter the cavities at the ends of these dies and shall engage the extremities of the strap-pieces 3, while the collars 8 engage the extremities of the bands 2. The end compression of these tongues and collars forces the bands inwardly on the strap-pieces, welding them securely thereto, and forces the hot metal of the band and of the ends of the strap-pieces into the lateral recesses of the end cavities of the dies, thus giving the ends of the buckle their proper shape and forming shoulders thereon, which impart great strength to the finished article, the dies 4 meanwhile holding the blank firmly in place and supplying the necessary resistance to the end compression. The buckle thus made will be found to be substantially integral, the parts being compacted and welded together with great solidity and strength. On removing the buckle from the dies it is necessary only to remove the thin shell of metal at the inner ends of the nuts by punching or drilling and to cut the threads on the interior of the nuts.

The advantages of my improvement will be appreciated by those skilled in the art.

The process is easily practiced, and buckles may be made in accordance therewith more rapidly and more cheaply than by the processes heretofore known.

Without restricting myself solely to the means which I have described for practicing my improved process, what I claim as my invention, and desire to secure by Letters Patent, is—

1. An improvement in the manufacture of turn-buckles, which consists in banding together the ends of strap-pieces and welding and shaping the parts of the blank so constituted to form the buckle, substantially as and for the purposes described.

2. An improvement in the manufacture of turn-buckles, which consists in shaping strap-pieces 3 3 into substantially the shape shown in Fig. 1 of the drawings, banding together the ends of the strap-pieces, and welding and shaping the parts of the blank so constituted to form the buckle, substantially as and for the purposes described.

3. An improvement in the art of making turn-buckles, which consists in encircling the ends of strap-pieces with bands and subjecting the ends of the blank to end pressure in suitable dies, whereby the bands are firmly welded to the straps and the ends of the blank are compressed and shaped, substantially as and for the purposes described.

4. An improvement in the art of making turn-buckles, which consists in encircling the ends of strap-pieces with bands and subjecting the ends of the bands and straps to end pressure in suitable dies, whereby the bands are forced on and firmly welded to the straps and the ends of the blank are compressed and shaped, substantially as and for the purposes described.

In testimony whereof I have hereunto set my hand this 1st day of October, A. D. 1888.

JAMES H. SIMPSON.

Witnesses:
W. B. CORWIN,
J. K. SMITH.